United States Patent [19]

Suga et al.

[11] Patent Number: 5,326,657
[45] Date of Patent: Jul. 5, 1994

[54] POLYMERIC SOLID ELECTROLYTES AND PRODUCTION PROCESS THEREOF

[75] Inventors: Masanobu Suga; Seiichi Akita; Nobuyuki Kuroda, all Kanagawa, Japan

[73] Assignee: Nippon Oil Co., Ltd., Tokyo, Japan

[21] Appl. No.: 917,974

[22] Filed: Jul. 24, 1992

[30] Foreign Application Priority Data

Jul ^  Japan .................................. 3-187654

[51] Int. Cl.⁵ .............................................. H01M 6/18
[52] U.S. Cl. ..................................................... 429/192
[58] Field of Search ........................................ 429/192

[56] References Cited

U.S. PATENT DOCUMENTS

| | | | |
|---|---|---|---|
| 4,556,614 | 12/1985 | Méhauté et al. | 429/192 |
| 4,556,615 | 12/1985 | Bannister | 429/192 |
| 4,681,822 | 7/1987 | Berthier et al. | 429/192 |
| 4,714,665 | 12/1987 | Slegel et al. | 429/192 |
| 4,734,343 | 3/1988 | Berthier et al. | 429/192 |
| 4,737,422 | 4/1988 | Knight et al. | 429/192 |
| 4,798,773 | 1/1989 | Yasukawa et al. | 429/192 |
| 4,851,307 | 7/1989 | Armand et al. | 429/192 |

FOREIGN PATENT DOCUMENTS

| | | |
|---|---|---|
| 4-211412 | 8/1992 | Japan . |
| 62-48716 | 3/1987 | Japan . |
| 62-285954 | 12/1987 | Japan . |

OTHER PUBLICATIONS

Fast Ion Transport in Solids, pp. 131-136, M. B. Armand, et al., "Poly-Ethers as Solid Electrolytes".

Primary Examiner—David B. Springer
Attorney, Agent, or Firm—Oblon, Spivak, McClelland, Maier & Neustadt

[57] ABSTRACT

The invention provides a specific polymeric solid electrolyte (ionically conductive polymer) having excellent physical properties, and a process therefor. The polymeric solid electrolyte can be obtained by reacting an alkali metal salt and/or ammonium salt, a non-aqueous organic solvent, a polyfunctional acrylate compound and a particular polyether macromonomer in the presence of a radical polymerization initiation accelerator and a radical polymerization initiator.

The polymeric solid electrolyte has high ionic conductivity so that it can be employed in useful lithium batteries, plastic batteries, large-capacity capacitors, electrochromic displays and it can also be used for the 100% solidification of other electronic devices.

8 Claims, No Drawings

POLYMERIC SOLID ELECTROLYTES AND PRODUCTION PROCESS THEREOF

BACKGROUND OF THE INVENTION a) Field of the Invention

This invention relates to ion-conductive polymers, in other words, to polymeric solid electrolytes and also to a process for the production thereof.

b) Description of the Related Art

Development of organic polymeric solid electrolytes is in progress in recent years, which compared to inorganic solid electrolytes, have such merits that (1) they have formability and can be easily formed into thin films of a large area and (2) they have flexibility and hence excellent contiguity with electrodes.

Mixtures of polyethylene oxide and alkali metal salts were proposed as polymeric solid electrolytes by M. B. Armand et al ["Fast Ion Transport in Solids" 131: North Holland Publishing Co., Ltd., 1979]

These solid electrolytes are each formed into a film by dissolving it in a solvent, casting the resulting solution on a forming surface and then drying off the solvent, namely, by the so-called casting process. Their forming process is therefore complex, and the films so obtained have an electrical conductivity as low as $10^{-6}$ S/cm or less at room temperature and fail to exhibit satisfactory contiguity with electrodes. There has accordingly been a desire for the improvements of these drawbacks.

Other production processes include the process disclosed in Japanese Patent Laid-Open No. 48716/1987 in which crosslinking is induced by a reaction between a trifunctional polyethylene glycol and a diisocyanate derivative; and the process disclosed in Japanese Patent Laid-Open No. 285954/1987 in which crosslinking is induced by a polymerization reaction of polyethylene glycol diacrylate. Each of these processes however uses a solvent so that an extra step is indispensable for drying off the solvent. Further improvements have also been considered necessary with respect to the balancing among the ionic conductivity, the contiguity with electrodes and so on.

In addition, the ionic conductivity of a polymeric solid electrolyte drops significantly in a low temperature range below room temperature. There has also been a strong demand for an improvement in this respect.

The present inventors have already proposed a process for the production of a polymeric solid electrolyte of the two-pack mixed hardening type, which process has overcome the above-described drawbacks (Japanese Patent Application No. 62685/1990).

Further improvements are however desired from the standpoint of the ionic conductivity of the polymeric solid electrolyte per se and the contiguity with electrodes. Described specifically, there has been a strong demand for a polymeric solid electrolyte whose ionic conductivity is $10^{-4}$ S/cm or higher at 0° C.

SUMMARY OF THE INVENTION

A first object of this invention is to provide a polymeric solid electrolyte having an ionic conductivity of at least $10^{-4}$ S/cm at 0° C. and good contiguity with electrodes.

A second object of this invention is to provide a process for the production of such a polymeric solid electrolyte.

The present inventors have conducted research with a view toward overcoming the above-described drawbacks of the conventional art. As a result, it has been found that a polymeric solid electrolyte can be produced by combining specific components without the need for any solvent which has to be eliminated and the polymeric solid electrolyte so obtained has an ionic conductivity of at least $10^{-4}$ S/cm at 0° C. and also good contiguity with electrodes, leading to the completion of the present invention.

In one aspect of the present invention, there is thus provided a polymeric solid electrolyte obtained by reacting, in the presence of a radical polymerization initiator and a radical polymerization initiation accelerator, the following compounds:

an alkali metal salt and/or ammonium salt;

a compound represented by the following formula (1):

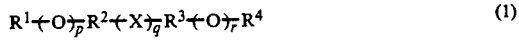

wherein X means

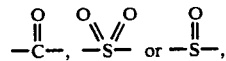

$R^1$ denotes a hydrocarbon group having 1-6 carbon atom(s), $R^2$ and $R^3$ represent a single bond or a divalent hydrocarbon group having 1-3 carbon atom(s), $R^4$ is a hydrocarbon group having 1-6 carbon atom(s) or a cyano group, $R^1$ and $R^4$ may be coupled together to form a ring, and p, q and r are individually 0 or 1 with the proviso that the sum of p, q and r is greater than 0 except when $R^4$ is a cyano group;

a compound represented by the following formula (2):

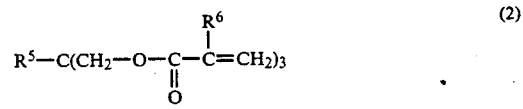

wherein $R^5$ means an alkyl group having 1-5 carbon atom(s) or

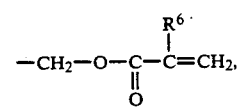

$R^6$ being a hydrogen atom or an alkyl group having 1-5 carbon atom(s); and a compound represented by the following formula (3):

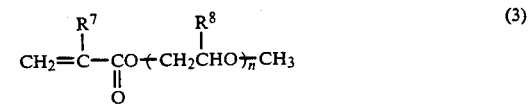

wherein $R^7$ and $R^8$ mean a hydrogen atom or an alkyl group having 1-5 carbon atom(s) and n stands for an integer of $1 \leq n \leq 30$.

In another aspect of the present invention, there is also provided a process for the production of a polymeric solid electrolyte, which comprises reacting, in the presence of a radical polymerization initiator and a radical polymerization initiation accelerator, the following compounds:

an alkali metal salt and/or ammonium salt;
a compound represented by the following formula (1):

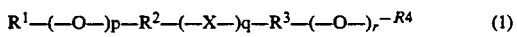

wherein X, $R^1$, $R^2$, $R^3$, $R^4$, p, q and r have the same meanings as defined above;
a compound represented by the following formula (2):

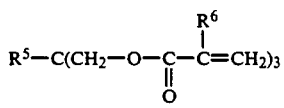

wherein $R^5$ and $R^6$ have the same meanings as defined above; and
a compound represented by the following formula (3):

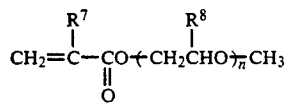

wherein $R^7$ and $R^8$ have the same meanings as defined above.

In a further aspect of the present invention, there is also provided a process for the production of a polymeric solid electrolyte, which comprises mixing the following liquids A and B, at least one of said liquids A and B containing an alkali metal salt and/or a quaternary ammonium salt.

Liquid A

A liquid comprising, as basic components, the following compounds:
a compound represented by the following formula (2):

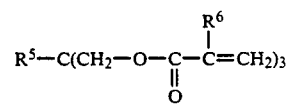

wherein $R^5$ and $R^6$ have the same meanings as defined above;
a compound represented by the following formula (3):

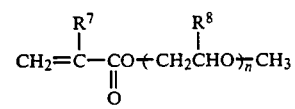

wherein $R^7$ and $R^8$ have the same meanings as defined above.

a radical polymerization initiation accelerator.

Liquid B

A liquid comprising, as basic components, the following compounds:
a compound represented by the following formula (1):

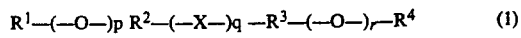

wherein X, $R^1$, $R^2$, $R^3$, $R^4$, p, q and r have the same meanings as defined above; and
a radical polymerization initiator.

The processes according to the present invention for the production of a polymeric solid electrolyte requires neither heating nor illumination of ultraviolet rays but require only mixing of particular liquids at room temperature so that, as production steps, are extremely simple and very advantageous. Further, the resulting polymeric solid electrolytes have an ionic conductivity as high as at least $10^{-4}$ S/cm at 0° C. and good contiguity with electrodes. They can therefore be used in a wide variety of fields, for example, in solid ionics elements intended for the achievement of total solidification such as lithium batteries, plastic batteries, large-capacity capacitors and electrochromic displays.

DETAILED DESCRIPTION OF THE INVENTION

In the present invention, the compound represented by the formula (1) takes a liquid form at room temperature, in other words, is a non-aqueous organic solvent.

In the formula (1), $R^1$ is a hydrocarbon group having 1-6, preferably 1-4 carbon atom(s), and can be an alkyl group such as methyl, ethyl, propyl, isopropyl, butyl, sec-butyl, tert-butyl, isobutyl or pentyl groups or an aryl group such as a phenyl group.

$R^2$ and $R^3$ are a single bond or a divalent hydrocarbon group having 1-3 carbon atom(s), and can be an alkylene group such as a methylene, ethylene or trimethylene group or an arylene group such as a phenylene group.

$R^4$ is a cyano group or a hydrocarbon group having 1-6, preferably 1-3 carbon atom(s). As this hydrocarbon group, a hydrocarbon group similar to that exemplified with respect to $R^1$ can be mentioned. Further, $R^1$ and $R^4$ may be coupled together to form a ring. In this case, each of $R^1$ and $R^4$ constitute not only the above-exemplified hydrocarbon group but also a part of a divalent hydrocarbon group.

Examples of such a divalent hydrocarbon group are those having 2-6 carbon atoms and include alkylene groups such as ethylene, trimethylene, propylene and tetramethylene groups p, q and r are individually either 0 or 1 and, except for $R^4$ being a cyano group, the sum of p+q+r is greater than 0 [(p+q+r)>0]. Further, X means

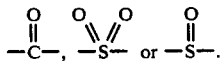

Specific examples of compounds represented by the formula (1) include ethylene carbonate, propylene carbonate, γ-butyrolactone, dimethoxyethane, acetonitrile, dimethylsulfoxide, dioxolane and sulfolane.

Although the compound represented by the formula (1) is usable in the present invention irrespective its dielectric constant, that having a dielectric constant of at least 30 is preferred.

The compound represented by the formula (2) is a tri- or tetra-functional compound having a radical-polymerizable acroyl group at the 3-terminal or 4-terminal thereof. When copolymerized with the compound represented by the formula (3), a three-dimensional network is formed.

In the formula (2), $R^5$ means

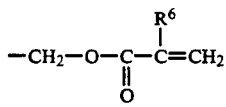

or an alkyl group having 1–5, preferably 1–4 carbon atom(s). Specific examples of the alkyl group include methyl, ethyl, propyl, isopropyl, butyl, sec-butyl, tert-butyl and isobutyl groups. $R^6$ is a hydrogen atom or an alkyl group having 1–5 carbon atom(s). As the alkyl group, those similar to the alkyl groups exemplified with respect to $R^5$ can be mentioned. Specific examples of such a compound include trimethylolpropane trimethacrylate, trimethylolpropane triacrylate, pentaerythritol tetracrylate and pentaerythritol tetramethacrylate.

The compound represented by the formula (3), which is also used in the present invention, is a polyether macromonomer having oxyethylene unit or units as a side chain as is evident from its structural formula, and is in a liquid form at room temperature.

In the formula (3), $R^7$ is a hydrogen atom or an alkyl group having 1–5, preferably 1–3 carbon atom(s). Illustrative of the alkyl group include methyl, ethyl, propyl, isopropyl, butyl and pentyl groups. Of these, a hydrogen atom or a methyl or ethyl group is desired as $R^7$.

$R^8$ means a hydrogen atom or an alkyl group having 1–5, preferably 1–3 carbon atom(s). Examples of the alkyl group include methyl, ethyl, propyl, isopropyl, butyl an pentyl groups. Of these, a hydrogen atom or a methyl, ethyl or propyl group is desired as $R^8$.

The number of oxyethylene unit or units in the compound represented by the formula (3), namely, the value of n is $1 \leq n \leq 30$, preferably $1 \leq n \leq 20$, more preferably $1 \leq n \leq 15$.

Specific examples of the compound represented by the formula (3) include methoxypolyethylene glycol methacrylate, ethoxypolyethylene glycol methacrylate, methoxypolyethylene glycol acrylate and ethoxypolyethylene glycol acrylate, all of which have oxyethylene unit or units within the above range.

No particular limitation is imposed on the radical polymerization initiator employed in the present invention, as long as it is soluble in the compound represented by the formula (3) and readily produces radicals. Organic peroxides and the like can be mentioned as preferred substances.

Exemplary organic peroxides include dialkyl peroxides, diacyl peroxide, peroxy esters, hydroperoxides, and ketoneperoxides. Specific examples include benzoyl peroxide, 2,4-dichlorobenzoyl peroxide, lauroyl peroxide, dicumyl peroxide, methyl ethyl peroxide, cyclohexanone peroxide, cumene hydroperoxide, t-butyl peroxyacetate, t-butyl peroxyisobutyrate, t-butyl peroxypivalate, acetyl peroxide, diisopropyl peroxycarbonate, paramethane hydroperoxide, di-isopropylbenzene hydroperoxide and propionyl peroxide, with benzoyl peroxide, t-butyl peroxyisobutyrate, acetyl peroxide and methyl ethyl peroxide being preferred.

No particular limitation is imposed on the radical polymerization initiation accelerator employed in the present invention, insofar as it is soluble in the compound represented by the formula (2) and/or the compound represented by the formula (3) and has action to reduce the above-described radical polymerization initiator. Various anilines, amines, reducing transition metal compounds, sulfur-containing compounds and the like can be mentioned by way of example.

Described specifically, they include anilines such as aniline, N,N-dimethylaniline, N,N-diethylaniline and N,N-dibutylaniline; amines such as triethylamine, diethylamine, piperidine and 1,2-diaminoethane; Fe (2) salts such as $FeCl_2 \cdot nH_2O$, FeS and $FeSO_4$; Co(2) salts such as $COCl_2$, $CoBr_2$, $CoSO_4$ and CoS; Mo(5) salts such as $MoCl_5$; thiols such as methanethiol, ethanethiol, benzenethiol, phenylmethanethiol, 1,4-butanethiol and p-mercaptobenzoic acid; thiolates such as potassium ethanethiolate and sodium ethanethiolate; sulfides such as diethyl sulfide, ethyl thiobenzene, 1,2-bis(methylthio)ethane, 4,4'-thiodibenzoic acid, 3-(methylthio)propanol, bis[(ethylthio)methyl]sulfide, thiacyclooctane, 1,2-dithiane and 2,3-dihydro-1,4-dithiaphthalein; and various sulfites and sulfinic acids. Among these, preferred are aniline, N,N-dimethylaniline, N,N-diethylaniline, triethylamine, $FeSO_4$, $FeCl_2 \cdot nH_2H_2O$, ethanethiol, benzenethiol, sodium ethanethiolate, and diethyl sulfide.

No particular limitation is imposed on the alkali metal salt and ammonium salt, insofar as they are soluble in the compound represented by the formula (1), (2) and/or the compound represented by the formula (3). Examples of the alkali metal salt include alkali metal perchlorates such as lithium perchlorate, sodium perchlorate and potassium perchlorate; alkali metal tetrafluoroborates such as lithium tetrafluoroborate, sodium tetrafluoroborate and potassium tetrafluoroborate; alkali metal hexafluorophosphates such as lithium hexafluorophosphate and potassium hexafluorophosphate; alkali metal trifluoroacetates such as lithium trifluoroacetate; and alkali metal trifluoromethanesulfonates such as lithium trifluoromethanesulfonate.

Exemplary ammonium salts include quaternary ammonium perchlorates such as tetraethylammonium perchlorate, tetraisopropylammonium perchlorate and tetra(n-butyl) ammonium perchlorate; quaternary ammonium tetrafluoroborates and hexafluorophosphates such as tetraethylammonium tetrafluoroborate, tetra (n-butyl)-ammonium tetrafluoroborate, tetraethylammonium hexafluorophosphate and tetra (n-butyl) ammonium hexafluorophosphate; quaternary ammonium of trifluoromethanesulfonates such as tetra(n-butyl)ammonium trifluoromethanesulfonate; N-alkylpyridium perchlorates; N,N-dialkylpyrrolidium perchlorates; N-alkylpyrrolidium tetrafluoroborates; N,N-dialkylpyrrolidium tetrafluoroborates; N-alkylpyrrolidium hexafluorophosphates; and N,N-dialkylpyrrolidium hexafluorophosphate.

The essential components of the present invention have been described above sequentially. Unless the objects of the present invention are impaired, it is also possible to add the following components represented by the following formulae (4) and (5), respectively:

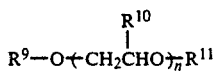

wherein $R^9$ and $R^{11}$ mean an alkyl group having 1-5 carbon atom (s), $R^{10}$ denotes a hydrogen atom or an alkyl group having 1-3 carbon atom(s), and n stands for an integer of $2 \leq n \leq 30$, and

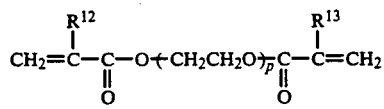

wherein $R^{12}$ and $R^{13}$ are either the same or different and mean an alkyl group having 1-5, preferably 1-3 carbon atom (s), such as a methyl, ethyl or propyl group, or a hydrogen atom, and p is 4-30, preferably 5-20.

The compound represented by the formula (4) is, as is evident from the structural formula, a polyether oligomer alkyl-etherified at the opposite ends and is in a liquid form at room temperature.

In the formula (4), $R^{10}$ means a hydrogen atom or an alkyl group having 1-3 carbon atom(s) and examples of the oxyalkylene unit include oxyethylene unit, oxypropylene unit and oxybutylene unit. Two or more different kinds of oxyalkylene units may also be contained together.

The number (n) of the oxyalkylene units is $2 \leq n \leq 30$, preferably $2 \leq n \leq 20$, more preferably $3 < n < 15$. Further, $R^9$ and $R^{11}$ in the formula (4) are individually an alkyl group having 1-5, preferably 1-3 carbon atom(s). Illustrative of the alkyl group include methyl, ethyl, propyl and isopropyl groups. Specific exemplary compounds include dimethoxypolyethylene glycol, diethoxypolyethylene glycol, dipropoxypolyethylene glycol, dimethoxypolypropylene glycol, diethoxypolypropylene glycol, dimethoxypolyethylenepropylene glycol and dimethoxypolyethylene-butylene glycol.

Particularly preferred examples of the compound represented by the formula (5) include those having an acrylic or methacrylic group at each of the opposite ends.

In the present invention, the desired polymeric solid electrolyte can be readily obtained by reacting the alkali metal salt and/or ammonium salt, the compound represented by the formula (1), the compound represented by the formula (2) and the compound represented by the formula (3) in the presence of the radical polymerization initiator and the radical polymerization initiation accelerator usually at 0°-50° C. preferably at 5°-40° C. without the need for intense heating or illumination of electromagnetic wave.

A description will next be made of the mixing ratio of the individual components.

The compound represented by the formula (1) can be reacted generally in an amount of 50-99, preferably 70-99, more preferably 80-98 parts by weight per 100 parts by weight of the resulting polymeric solid electrolyte.

The compound represented by the formula (2) and the compound represented by the formula (3) can be charged preferably at a weight range of from 1:100 to 2:1, more preferably from 1:50 to 1:1.

Further, the sum of the compound represented by the formula (2) and the compound represented by the formula (3) can be 1-30 parts by weight, preferably 1-20 parts by weight, more preferably 2-20 parts by weight, per 100 parts by weight of the resulting polymeric solid electrolyte.

When the compound represented by the formula (4) is added, it can be added preferably at a molar ratio of from 0:1 to 2:1, more preferably at a molar ratio of from 0:1 to 1:1 relative to the compound represented by the formula (1).

When the compound represented by the formula (5) is added, it can be added preferably at a molar ratio of from 0:1 to 10:1, more preferably at a molar ratio of from 0:1 to 5:1 relative to the compound represented by the formula (2).

The content of the alkali metal salt and/or ammonium salt in the present invention is preferably in a range of 1-30 parts by weight, more preferably in a range of 3-20 parts by weight per 100 parts by weight of the resulting polymeric solid electrolyte.

The radical polymerization initiator and the radical polymerization initiation accelerator can be charged at a molar ratio preferably in a range of from 1:10 to 10:1, more preferably in a range of from 1:5 to 5:1. The total amount of the radical polymerization initiator and the radical polymerization initiation accelerator can range preferably from 0.001 to 10 parts by weight, more preferably 0.005-5 parts by weight per 100 parts by weight of the resulting polymeric solid electrolyte.

It is also preferable to add a radical polymerization retarder in the present invention so that the hardening velocity can be controlled.

No particular limitation is imposed on the radical polymerization retarder as long as it can act to inhibit or suppress a radical polymerization reaction. Preferred examples include stabilized organic radicals such as organic oxygen radicals and organic nitrogen radicals, e.g., 1,1-diphenyl-2-picrylhydrazyl (DPPH), 1,3,5-triphenylpheldzyl (VDZ), 2,6-di-t-butyl-α-3,5-di-t-butyl-4-oxo-2,5-cyclohexadien-1-ylidene-p-tolyloxyl (Galvinoxyl), 2,2,6,6-tetramethyl-4-piperidon-1-oxyl, N-(3-N-oxyanilino-1,3-dimethylbutylidene)-anilinoxide and tri-p-nitrophenylmethyl; high atomic valency metal salts such as ferric chloride, ferric bromide and cupric chloride; quinones such as dichloroquinone and hydroquinone; organic sulfurs such as dithiobenzoyl disulfide. Among these, stabilized radicals such as DPPH are particularly preferred. Incidentally, the term "stabilized" of "stabilized radicals" as used herein means that the radicals are stable usually at 0°-50° C., preferably at 5°-40° C.

The molar ratio of the radical polymerization retarder to the radical polymerization initiator is generally not greater than 2, preferably 0.001-1.5, notably 0.01-1.0. Needless to say, two or more radical polymerization retarders can be used in combination.

No particular limitation is imposed on the order of addition of the individual components upon synthesis of the polymeric solid electrolyte of this invention. As a preferred example, the following process making use of two liquids will be described.

Liquid A is prepared by adding the compound represented by the formula (2) and the radical polymerization initiation accelerator to the compound represented by the formula (3) and then dissolving the former in the latter.

Liquid B, on the other hand, is prepared by adding the radical polymerization initiator to the compound represented by the formula (1) and dissolving the former in the latter.

The alkali metal salt and/or ammonium salt can be added to either Liquid A or Liquid B, but the addition to Liquid B is preferred in view of solubility.

When the radical polymerization retarder is used, it can be added to either Liquid A or Liquid B or to both.

When the compound represented by the formula (4) is used, it can also be added to either Liquid A or Liquid B or to both.

It is also possible to mix a portion of the compound represented by the formula (1), which is used as Liquid B, to Liquid A in order to use it as a component of Liquid A.

The compound represented by the formula (1), however, should be added to Liquid A when the compound represented by the formula (5) is used.

The polymeric solid electrolyte according to the present invention can be obtained by mixing and hardening Liquid A and Liquid B. No specific limitation is imposed on the mixing ratio of Liquid A to Liquid B as long as the objects of the present invention are not impaired. In general, the weight ratio of Liquid A to Liquid B is in a range of from 1:100 to 1:0.1, with a range of from 1:50 to 1:0.5 being preferred.

Upon mixing Liquid A and Liquid B, the temperature is generally in a range of 0°–50° C., preferably 5°–40° C. Of course, the handling of both the liquids should be conducted in an inert gas atmosphere such as $N_2$ or Ar.

When no radical polymerization retarder is used in the process of this invention, hardening begins to take place as soon as Liquid A and Liquid B are mixed simply, and no other particular treatment or processing is required. The temperature at the time of the hardening is generally controlled in a range of 0°–50° C., preferably 5°–40° C. The hardening time is suitably determined by various parameters such as the charged amounts of the individual components and the temperature. From the viewpoint of productivity, it is however desired to control the hardening time in a range of from 5 minutes to 5 hours, preferably from 10 minutes to 3 hours.

When the radical polymerization retarder is used, hardening begins take place when a certain induction period has elapsed after Liquid A and Liquid B were mixed. No other special treatment or processing is required. The temperature at the time of the hardening is, however, controlled normally in a range of 0°–50° C., preferably 5°–40° C. The hardening time is suitably determined by various parameters such as the charged amounts of the individual components and the temperature. From the viewpoint of productivity, it is however desired to control the hardening time in a range of from 5 minutes to 12 hours, preferably from 10 minutes to 5 hours.

According to the process of this invention, hardening can be effected by simply mixing Liquid A and Liquid B, which have been prepared in advance, without the need for heating and illumination of ultraviolet rays or radiation. As a process for the production of a polymeric solid electrolyte, the process of the present invention is simple and extremely advantageous.

Although the drying-off step of a solvent is indispensable in the conventional casting process which uses the solvent, the process according to this invention naturally does not require any step for driving off a solvent because there is practically no solvent to be eliminated. In addition, the process of the present invention makes it possible to form a film directly on electrodes if desired so that the contiguity with the electrodes can be improved. Production of the polymeric solid electrolyte according to this invention can be suitably effected by mixing Liquid A with Liquid B, which have been prepared in advance, in the presence of a porous synthetic resin film employed as a separator in a battery, such as a porous polypropylene film or a non-woven polypropylene fabric.

The present invention will hereinafter be described specifically by the following examples. It should however be borne in mind that the present invention is not limited to the following examples.

EXAMPLE 1

Liquid A was prepared by adding 0.2 g of N,N-dimethylaniline to a liquid mixture consisting of 10 g of methoxypolyethylene glycol monomethacrylate ("M90G", trade name; product of Shin-Nakamura Chemical Co., Ltd.; number of oxyethylene units: 9) and 2 g of trimethylolpropane trimethacrylate.

Liquid B was prepared by adding 0.85 g of lithium perchlorate to 10.0 g of propylene carbonate and then 0.04 g of benzoyl peroxide to the resultant mixture.

Those Liquids A and B were mixed at a weight ratio of 1:9 at room temperature of 25° C. and were immediately cast at room temperature on a surface of a polypropylene plate. Hardening was completed twenty minutes later, whereby a gel-like film free from bleeding was obtained. The ionic conductivity of the film was measured by the AC. impedance method. It was found to be $1.5 \times 10^{-3}$ S/cm at 0° C.

EXAMPLE 2

Liquid A was prepared by adding 0.2 g of N,N-dimethylaniline to a liquid mixture consisting of 10 g of methoxypolyethylene glycol monomethacrylate ("M90G", trade name; product of Shin-Nakamura Chemical Co., Ltd.; number of oxyethylene units: 9) and 2 g of trimethylolpropane trimethacrylate.

Liquid B was prepared by adding 0.61 g of lithium perchlorate to a mixture, which consisted of 5 g of propylene carbonate and 5 g of dimethoxyethane, and then 0.04 g of benzoyl peroxide to the resultant mixture.

Those Liquids A and B were mixed at a weight ratio of 1:9 at room temperature of 25° C. and were immediately cast at room temperature on a surface of a polypropylene plate. Hardening was completed twenty minutes later, whereby a gel-like film free from bleeding was obtained. The ionic conductivity of the film was measured by the AC. impedance method. It was found to be $2.8 \times 10^{-3}$ S/cm at 0° C.

EXAMPLE 3

Liquid A was prepared by adding 0.2 g of N,N-dimethylaniline to a liquid mixture consisting of 10 g of methoxypolyethylene glycol monomethacrylate ("M90G", trade name; product of Shin-Nakamura Chemical Co., Ltd.; number of oxyethylene units: 9) and 2 g of trimethylolpropane trimethacrylate.

Liquid B was prepared by adding 0.85 g of lithium perchlorate to a mixture, which consisted of 5 g of propylene carbonate and 5 g of polyethylene glycol dimethyl ether (number of oxyethylene units: about 4), and then 0.04 g of benzoyl peroxide to the resultant mixture.

Those Liquids A and B were mixed at a weight ratio of 1:9 at room temperature of 25° C. and were immediately cast at room temperature on a surface of a polypropylene plate. Hardening was completed fifteen minutes later, whereby a gel-like film free from bleeding was obtained. The ionic conductivity of the film was measured by the AC. impedance method. It was found to be $0.83 \times 10^{-3}$ S/cm at 0° C.

EXAMPLE 4

Liquid A was prepared by adding 0.2 g of N,N-dimethylaniline to a liquid mixture consisting of 10 g of methoxypolyethylene glycol monomethacrylate ("M90G", trade name; product of Shin-Nakamura Chemical Co., Ltd.; number of oxyethylene units: 9) and 2 g of pentaerythritol tetracrylate.

Liquid B was prepared by adding 0.63 g of lithium perchlorate to 10.0 g of propylene carbonate, and then 0.04 g of benzoyl peroxide to the resultant mixture.

Those Liquids A and B were mixed at a weight ratio of 1:9 at room temperature of 25° C. and were immediately cast at room temperature on a surface of a polypropylene plate. Hardening was completed fifteen minutes later, whereby a gel-like film free from bleeding was obtained. The ionic conductivity of the film was measured by the AC. impedance method. It was found to be $1.1 \times 10^{-3}$ S/cm at 0° C.

EXAMPLE 5

Liquid A was prepared by adding 0.3 g of trimethylamine to a liquid mixture consisting of 10 g of methoxypolyethylene glycol monomethacrylate ("M90G", trade name; product of Shin-Nakamura Chemical Co., Ltd.; number of oxyethylene units: 9) and 2 g of trimethylolpropane trimethacrylate.

Liquid B was prepared by adding 0.85 g of lithium perchlorate to 10.0 g of propylene carbonate, and then 0.04 g of benzoyl peroxide to the resultant mixture.

Those Liquids A and B were mixed at a weight ratio of 1:9 at room temperature of 25° C. and were immediately cast at room temperature on a surface of a polypropylene plate. Hardening was completed twenty-two minutes later, whereby a gel-like film free from bleeding was obtained. The ionic conductivity of the film was measured by the AC. impedance method. It was found to be $0.9 \times 10^{-3}$ S/cm at 0° C.

EXAMPLE 6

Liquid A was prepared by adding 0.2 g of N,N-dimethylaniline to a liquid mixture consisting of 10 g of methoxypolyethylene glycol monomethacrylate ("M90G", trade name; product of Shin-Nakamura Chemical Co., Ltd.; number of oxyethylene units: 9) and 2 g of trimethylolpropane trimethacrylate.

Liquid B was prepared by adding 0.73 g of lithium perchlorate to 10.0 g of propylene carbonate, and then 0.04 g of benzoyl peroxide and, as a polymerization retarder, 3 mg of 1,1-diphenyl-2-picrylhydrazyl (DPPH) to the resultant mixture.

Those Liquids A and B were mixed at a weight ratio of 1:9 at room temperature of 25° C. and were immediately cast at room temperature on a surface of a polypropylene plate.

No viscosity increase took place during the first 40 minutes so that an induction period was indicated. The viscosity then began to rise and hardening was completed 110 minutes later, whereby a gel-like film was obtained. The ionic conductivity of the film was measured by the AC. impedance method. It was found to be $1.5 \times 10^{-3}$ S/cm at 0° C. Owing to the existence of the induction period, it was possible to produce a polymeric solid electrolyte with extreme ease.

EXAMPLE 7

Liquids A and B of Example 6 were mixed at a weight ratio of 1:9, and a non-woven polypropylene fabric (product of Japan Vilene Co., Ltd.; thickness: 40 μm) was immediately impregnated with the resulting mixture. Owing to the existence of a sufficient induction period until the mixture hardened, it was possible to obtain a semitransparent, polymeric solid electrolyte film with extreme ease. The ionic conductivity of the film was measured by the AC. impedance method. It was found to be $0.81 \times 10^{-3}$ S/cm at 0° C.

EXAMPLE 8

Liquid A was prepared by adding 0.2 g of N,N-dimethylaniline to a liquid mixture consisting of 10 g of methoxypolyethylene glycol monomethacrylate ("M90G", trade name; product of Shin-Nakamura Chemical Co., Ltd.; number of oxyethylene units: 9), 2 g of trimethylolpropane trimethacrylate and 48 g of propylene carbonate.

Liquid B was prepared by adding 5.1 g of lithium perchlorate to 60 g of propylene carbonate, and then 0.04 g of benzoyl peroxide to the resultant mixture.

Those Liquids A and B were mixed at a weight ratio of 1:1 at room temperature of 25° C. and were immediately cast at room temperature on a surface of a polypropylene plate. Hardening was completed twenty minutes later, whereby a gel-like film free from bleeding was obtained. The ionic conductivity of the film was measured by the AC. impedance method. It was found to be $1.3 \times 10^{-3}$ S/cm at 0° C.

What is claimed is:

1. A polymeric solid electrolyte having an ionic conductivity of at least about $10^{-4}$ S/cm at 0° C., which is obtained by reacting, in the presence of a radical polymerization initiator and a radical polymerization-initiation accelerator, an effective amount of each of the following compounds:

a) a compound selected from the group consisting of alkali metal perchlorates, alkali metal tetrafluoroborates, alkali metal hexafluorophosphates, alkali metal trifluoroacetates, alkali metal trifluoromethanesulfonates, quaternary ammonium perchlorates, quaternary ammonium tetrafluoroborates, quaternary ammonium hexafluorophosphates, quaternary ammonium trifluoromethanesulfonates, N-alkyl pyridinium perchlorates, N,N-dialkylpyrrolidium perchlorates, N-alkyl pyridinium tetrafluoroborates, N,N-dialkylpyrrolidium tetrafluoroborates, N-alkyl pyridinium tetrafluoroborates, N,N-dialkylpyrrolidium tetrafluoroborates, N-alkylpyrrolidium hexafluorophosphates and N,N-dialkylpyrrolidium hexafluorophosphates;

b) the compound selected from the group consisting of ethylene carbonate, propylene carbonate, γ-butyrolactone, dimethoxyethane, acetonitrile, dimethylsulfoxide, dioxolane and sulfolane;

c) a compound having the formula:

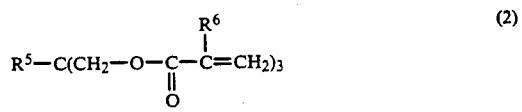

wherein $R^5$ is an alkyl group having 1 to 5 carbon atoms, or a group of the formula:

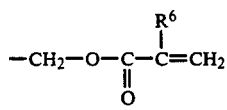  (5)

wherein $R^6$ is a hydrogen atom or an alkyl group of 1 to 5 carbon atoms;

d) a compound having the formula:

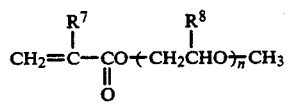  (3)

wherein $R^7$ and $R^8$ are independently each a hydrogen atom or an alkyl group having 1 to 5 carbon atoms, and n is an integer such that $1 \leq n \leq 30$.

2. The polymeric solid electrolyte of claim 1, wherein said compound c) is selected from the group consisting of trimethylolpropane, trimethacrylate, trimethylolpropane triacrylate, pentaerythritol tetraacrylate and pentaerythritol tetramethacrylate.

3. The polymeric solid electrolyte of claim 1, wherein $R^7$ or both of compound d) is a group selected from the group consisting of methyl, ethyl, propyl, isopropyl, butyl and pentyl.

4. The polymeric solid electrolyte of claim 1, wherein compound (b) is reacted in an amount of 50-99 parts by weight per 100 parts by weight of the resulting polymeric solid electrolyte.

5. The polymeric solid electrolyte of claim 1, wherein the compound c) and compound d) are charged at a weight range of form 1:100 to 2:1.

6. The polymeric solid electrolyte of claim 1, wherein compound c) and compound d) are reacted in a total amount of 1-50 parts by weight per 100 parts by weight of the resulting polymeric solid electrolyte.

7. A process for the production of a polymeric solid electrolyte, which comprises reacting, in the presence of a radical polymerization initiator and a radical polymerization initiator accelerator, the following compounds:

a) a compound selected from the group consisting of alkali metal perchlorates, alkali metal tetrafluoroborates, alkali metal hexafluorophosphates, alkali metal trifluoroacetates, alkali metal trifluoromethanesulfonates, quaternary ammonium perchlorates, quaternary ammonium tetrafluoroborates, quaternary ammonium hexafluorophosphates, quaternary ammonium trifluoromethane sulfonates, N-alkylpyridium perchlorates, N,N-dialkylpyrrolidium perchlorates, N-alkylpyrrolidium tetrafluoroborates, N,N-dialkylpyrrolidium tetrafluoroborates, N-alkylpyrrolidium hexafluorophosphates and N,N-dialkylpyrrolidium hexalfuorophosphates;

b) a compound selected from the group consisting of ethylene carbonate, propylene carbonate, γ-butyrolactone, dimethoxyethane, acetonitrile, dimethylsulfoxide, dioxolane and sulfolane;

c) a compound having the formula:

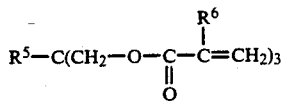  (2)

wherein $R^5$ is an alkyl group having 1 to 5 carbon atoms, or a group of the formula:

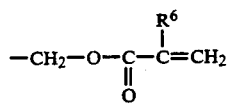  (5)

wherein $R^6$ is a hydrogen atom or an alkyl group of 1 to 5 carbon atoms; and d) a compound having the formula:

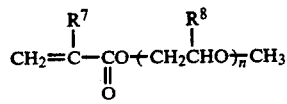  (3)

wherein $R^7$ and $R^8$ are independently each a hydrogen atom or an alkyl group having 1 to 5 carbon atoms, and n is an integer such that $1 \leq n \leq 30$.

8. A process for the production of a polymeric solid electrolyte, which comprises mixing the following liquids A and B, at least one of said liquids A and B containing an alkali metal salt or a quaternary ammonium salt or both, wherein liquid A comprises, as basic components, the following compounds:

i. a compound having the formula (2):

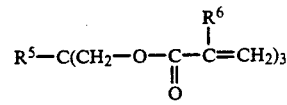  (2)

wherein $R^5$ is an alkyl group having 1 to 5 carbon atoms or a group of the formula:

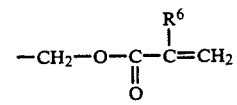  (5)

wherein $R^6$ is a hydrogen atom or an alkyl group having 1 to 5 carbon atoms; and ii) a compound represented by the formula (3):

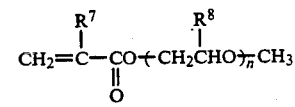  (3)

wherein $R^7$ and $R^8$ are each independently a hydrogen atom or an alkyl group having 1 to 5 carbon, and wherein n is an integer such that $1 \leq n \leq 30$; and a radical polymerization initiation accelerator; and wherein liquid B comprises, as basic components, the following compounds:

i) a compound selected from the group consisting of ethylene carbonate, propylene carbonate γ-butyrolactone, dimethoxyethane, acetonitrile, dimethylsulfoxide, dioxolane and sulfolane; and a radical polymerization initiator.

* * * * *

UNITED STATES PATENT AND TRADEMARK OFFICE
CERTIFICATE OF CORRECTION

PATENT NO.   : 5,326,657
DATED        : July 5, 1994
INVENTOR(S)  : Masanobu SUGA, et al.

It is certified that error appears in the above-indentified patent and that said Letters Patent is hereby corrected as shown below:

On the title page, Item [30], the Foreign Application Priority
   Date has been omitted and should read as follows:

--Jul. 26, 1991--

Signed and Sealed this

Sixth Day of September, 1994

Attest:

BRUCE LEHMAN

*Attesting Officer*          *Commissioner of Patents and Trademarks*